United States Patent

[11] 3,545,819

[72] Inventors William Charles Gaffney
Renton;
Ervin G. Romero, Seattle, Washington
[21] Appl. No. 816,724
[22] Filed April 16, 1969
[45] Patented Dec. 8, 1970
[73] Assignee The Boeing Company
Seattle, Washington
a corporation of Delaware

[54] ANTISKID CONTROL SYSTEM
16 Claims, 5 Drawing Figs.
[52] U.S. Cl. .................................................... 303/21,
244/111, 303/20
[51] Int. Cl. ....................................................... B60t 8/08
[50] Field of Search ........................................... 303/20, 21;
244/111

[56] References Cited
UNITED STATES PATENTS
3,245,213  4/1966  Thompson et al. ............  303/21
3,245,727  4/1966  Anderson et al. .............  303/21
3,398,995  8/1968  Martin ...........................  303/21
3,441,320  4/1969  Flory .............................  303/21
3,450,444  6/1969  Ballard .........................  303/21
3,494,671  2/1970  Slavin et al. ..................  303/21

Primary Examiner—Duane A. Reger
Attorneys—Glenn Orlob, Kenneth W. Thomas and Conrad O. Gardner ABSTRACT: An antiskid control system which includes means for preventing interaction between the system and the natural oscillation of the landing gear. A frequency clamping circuit arrangement includes a one shot multivibrator which controls a switch in the path of the valve dump voltage. The multivibrator is set by the removal of an antiskid control signal, the set state of the multivibrator exists for a time period sufficient to prevent the application of a second dump voltage antiskid control signal to the valve within the natural resonant frequency period of the landing gear. This prevents the antiskid system from sustaining an oscillation of the gear and stabilizes the skid control system.

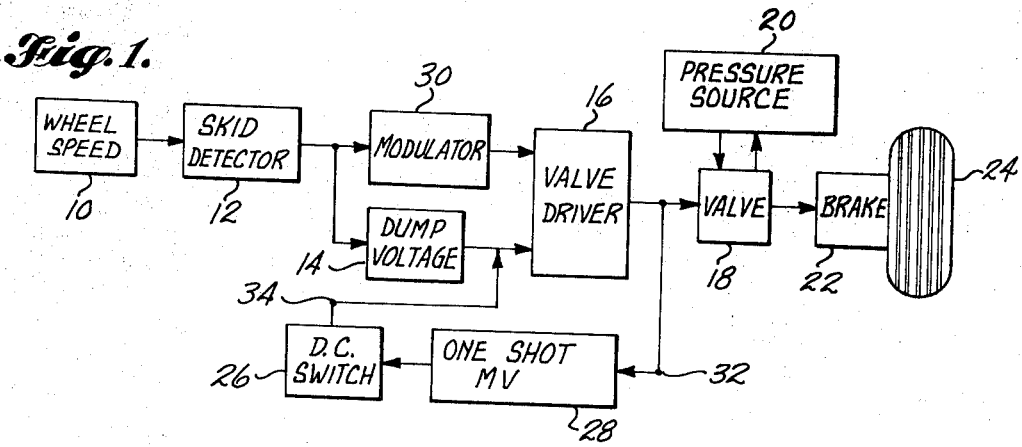
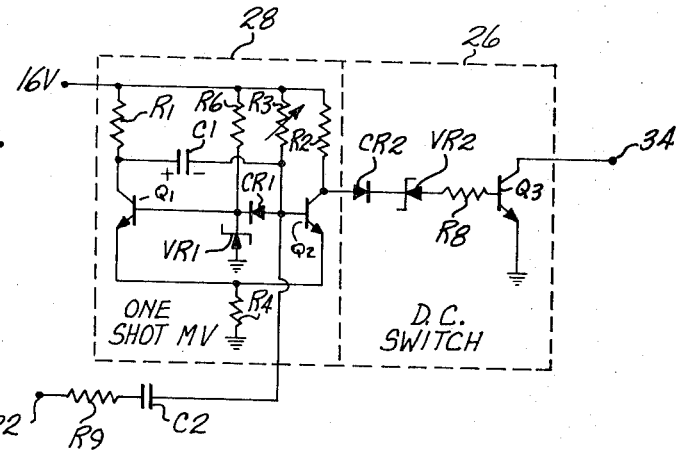
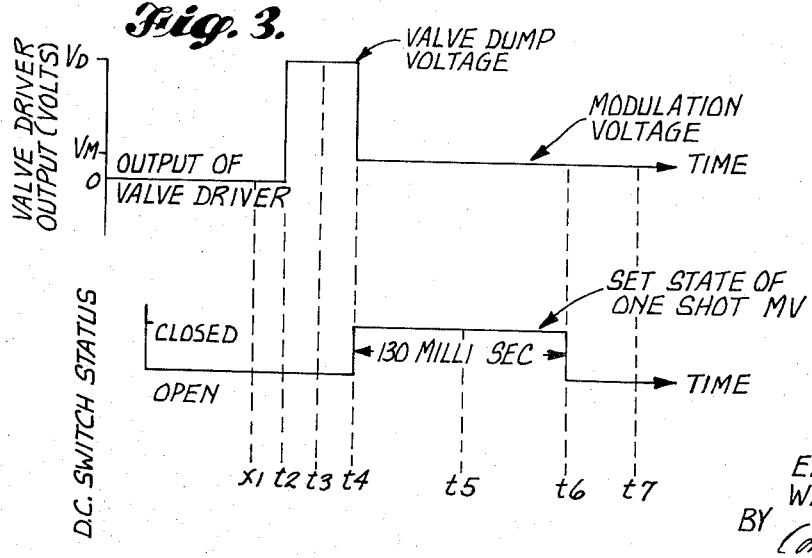
INVENTORS:
ERVIN G. ROMERO
WILLIAM C. GAFFNEY
BY Conrad J. Gardner
ATTORNEY

INVENTORS:
ERVIN G. ROMERO
WILLIAM C. GAFFNEY
BY

ATTORNEY 3,545,819

ANTISKID CONTROL SYSTEM

This invention relates to brake control systems for vehicles, and more particularly to antiskid control type brake control systems.

It is desirable to prevent skidding of a braked wheel and even more desirable to further sense incipient skids and provide control of a wheel being braked before the overtorqued condition is reached. Antiskid control systems have been developed which detect an actual skid and provide a control signal of the type termed a "dump voltage" which is applied to the servopilot valve thereby bypassing fluid under pressure around the brake cylinder. The servopilot valve (a flapper-nozzle valve) provides bypassing of fluid in proportion to the amplitude of the applied control signal. A dump voltage is provided to the valve when an actual skid condition occurs and is a maximum amplitude applied control signal which causes maximum relaxation of braking effort necessary when the wheel has decelerated into an actual skid and it is necessary to bring the wheel back up to a speed where braking action can again become effective. A further class of present state of the art antiskid systems now also detects incipient skid conditions and provides a control signal which is applied to the servo valve which is of less amplitude that than the aforementioned "dump voltage" type control signal of maximum amplitude required when an actual skid condition is detected. These state of the art systems provide a control signal to the servo valve which is modulated in accordance with the information detected during incipient skid conditions and which causes as a consequence the modulation of brake pressure in accordance with the preskid information detected and processed.

Improvement in antiskid control systems is critically dependent upon response of the system to incipient skid control information detected. The great difficulty encountered in achieving this objective by maintaining high sensitivity and frequency response has been the occurrence of instability in proposed systems attempting to achieve these critical objectives. The instability of proposed antiskid control systems has been caused by the introduction into the system of gear deflection developed information along with the desired skid and preskid information. The wheel support member or landing gear of an aircraft is not completely rigid and braking force when applied causes deflection of the landing gear rearward, which results in wheelspeed deceleration, causing the system to react to this information in the same manner as if the wheel deceleration were due to an incipient skid and results in a control signal being applied to the valve releasing the brakes. This release of brakes and rearward loading of the gear then permits the resilient landing gear to move the wheel back through its normal position and the inertia of landing gear and wheel cause forward deflection of gear and wheel acceleration which results in removal of control signal and reapplication of the brake by the antiskid control system and another rearward deflection of the gear. Subsequent release of brakes causes increased amplitude forward deflection of the landing gear. The amplitudes of landing gear oscillation may be caused to increase in this manner toward the strength limits of the structure. It is most desirable that an antiskid control system respond to preskid information by generating a control signal based on this information for application to the valve to release brake pressure as required, and it is also important to provide a dump voltage to the valve for maximum brake release when an actual skid occurs; however, landing gear deflection information generated when gear oscillation occurs causing as in a skid condition the occurrence of a dump voltage must not be permitted to repeat itself, thereby contributing to increased gear oscillation at the natural resonant frequency of vibration of the gear structure.

It is therefore an object of this invention to provide for reducing the deleterious effects of landing gear vibrations on braking systems.

It is yet a further object of this invention to provide reduced interference to antiskid control system operation by oscillation of the landing gear.

It is still another object of this invention to provide means in an antiskid control system which permits the system to respond to a skid condition which requires a large dump of pressure while preventing the system from responding to repeated pressure dumps caused by gear oscillation.

It is still a further object of this invention to provide for preskid information processing and skid information processing in antiskid control systems while preventing continued skid control system response to information generated in the system due to gear oscillation occurring at the natural frequency of oscillation of the gear.

Other objects of this invention will become apparent from the following description when taken in conjunction with the accompanying drawings in which:

FIG. 1 is a block diagram of antiskid apparatus embodying the principles of the invention;

FIG. 2 is a schematic diagram of the stabilizing circuit portion of the antiskid apparatus of FIG. 1;

FIG. 3 is a graph illustrating the relationships along a time axis between the output of the valve driver and the status of the DC switch;

Figure 4:
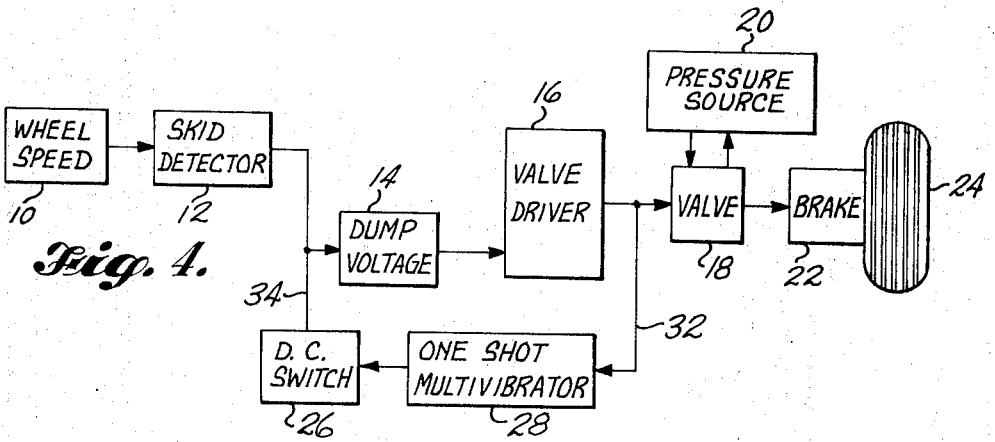
FIG. 4 is a block diagram of a further type of antiskid apparatus which embodies the principles of the invention.

In accordance with the invention, a timing means is actuated by removal of a skid-control signal represented by a valve dump voltage. The actuation of the timing means further actuates a switch which does not permit another dump voltage to be applied to the valve during the timing period of the timing means. The timing period of the timing means is predetermined by choice of circuit constants of the timing circuit and is set after a determination has been made of the natural frequency of the landing gear structure. When the predetermined time period is set to exceed the natural frequency of the landing gear then the switch will not allow a dump voltage within the natural period of the gear to pass to the valve and dump pressure.

Referring now to FIG. 1 of the drawings, there is depicted in block diagram form an antiskid system illustrative of one class of systems incorporating therein a stabilizing arrangement in accordance with the teachings of the present invention. Exemplary of this class of systems is that system described in U.S. Pat. No. 3,245,727 to Anderson et al. This class of systems develops wheelspeed type information from wheel transducers. In FIG. 1 of this application, wheelspeed type information which comprises the input information to the antiskid system is represented by block 10 which includes the wheel transducer, frequency sensing and wave shaping functions performed as in the control diagram FIG. 2 of the above-referred-to Anderson et al. patent. The wheelspeed information thus developed is transmitted to the skid detector portion of the system represented by block 12 in FIG. 1 of this application. The skid detector 12 includes circuitry as represented in FIG. 2 of Anderson et al. for integrating wheelspeed for further providing the proper type of signal related to rate of change of wheelspeed for modulator utilization and also provides for actual skid detection and consequent skid or dump signal generation. The dump signal is provided as one of the inputs to the DC Amp. of FIG. 2 of the above-identified patent while the other input to the DC Amp. comes from the modulator which includes the Slip Rate Amp. and Slip Rate Threshold, the Valve Driver of FIG. 1 of this application functioning to provide sufficient amplification of modulator 30 and dump voltage 14 output signal levels to drive the valve 18 in the same manner that the DC Amp. of FIG. 2 of the above-identified Anderson et al. patent drives its Valve. This class of skid-control systems has the advantage of controlling pressure release based on preskid information as well as controlling pressure based on actual skid information detected and processed. One-shot MV (multivibrator) 28 and DC switch 26 incorporated into the system of FIG. 1 in the particular manner shown permit the system to respond to preskid information and generate a control signal by means including the modulator 30. The particular arrangement of one-shot multivibrator 28 and DC switch 26 also permits skid information to generate a second form of control signal in the form of a dump voltage without permitting the system performance to deteriorate by permitting a second dump voltage to be generated and again actuate brake release in response to a gear vibration at the natural frequency of the gear. The advantages of such stabilization of the antiskid system are readily apparent since high gain and sensitivity to preskid information can be maintained while also permitting immediate dump voltage control of the valve to release brake pressure when a skid condition is indicated. A succession of large pressure dumps is not permitted when due to natural frequency vibration of the landing gear.

In FIG. 1 it can be seen that the dump voltage (after amplification by the valve driver) is sampled by coupling of the input terminal 32 of the stabilizing circuit arrangement in the output circuit path of the valve driver. The valve dump voltage is thus seen as furnishing the input signal to the stabilizing circuit arrangement while the output terminal 34 of the stabilizing circuit arrangement is coupled back to the dump voltage output circuit path in a manner that inhibits the subsequent transmission of a second dump voltage to the valve driver 16 during the time period of natural frequency of vibration of the landing gear as is further explained hereinafter in more detail. While blocks 10, 12, 14, 16, 18, 22, 24, and 30 of FIG. 1 of this application may include circuitry corresponding to that found in patent to Anderson et al. as discussed previously, these blocks should not be considered to be limited to circuitry therein disclosed and incorporated herein by reference but should be considered as representative of circuitry of systems of the same class known to those skilled in the art and modifications thereof which can be practiced by those skilled in the art. The features of this invention which contribute the better system performance and improved characteristics are provided by the circuitry in blocks 26 and 28 shown in detail in FIG. 2 and organized in the system as shown in FIG. 1.

Figure 5:
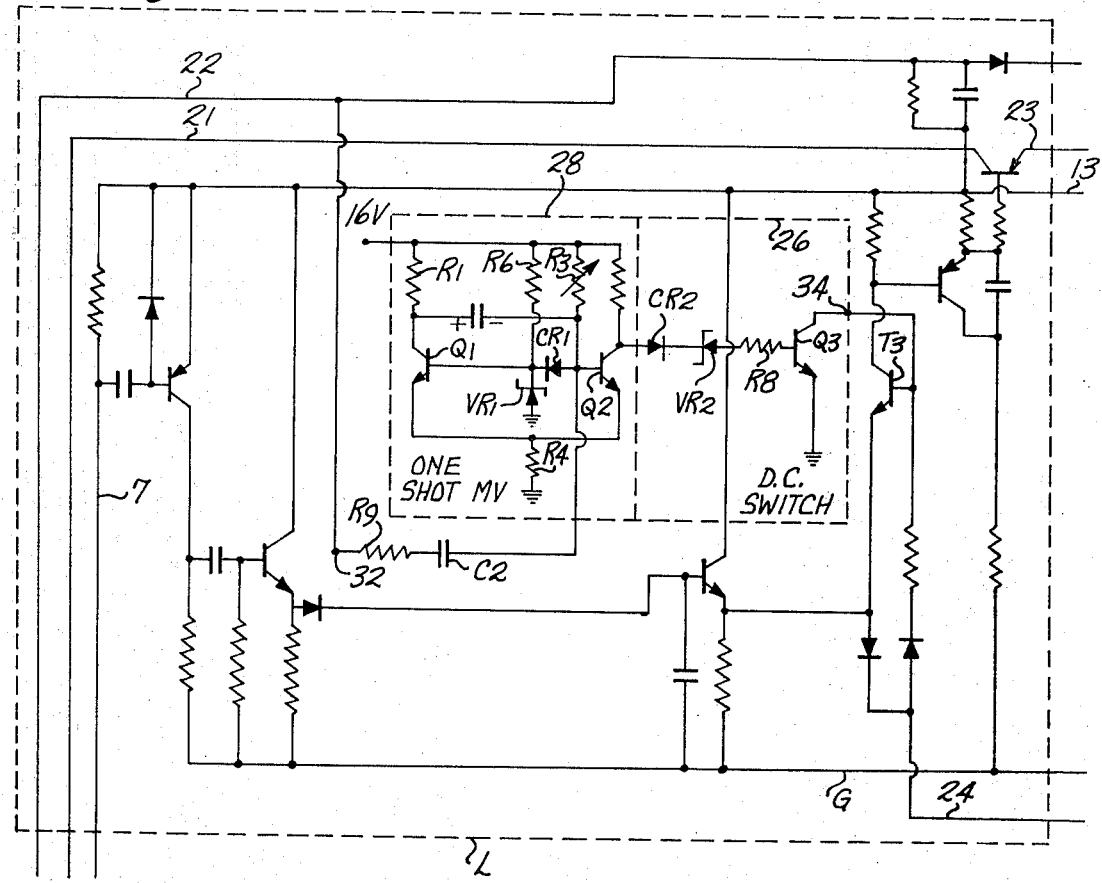
FIG. 5 is a schematic diagram of a stabilizing circuit of the type shown in FIG. 2 connected in a portion of a circuit of the apparatus shown in FIG. 4.

Proceeding now to FIG. 2, there is shown in block 28 a one-shot multivibrator circuit which has an input terminal 32 which may be adapted as shown in FIG. 1 for receiving the valve dump voltage signal which is the valve voltage signal represented by block 14, as amplified by the valve driver of block 16 in FIG. 1. In its normal state, transistor Q2 is in the "on" condition with current flowing in the collector-emitter path of Q2. Transistor Q1 is in the "off" condition with no current conduction in the collector emitter path. With the circuit component values listed below for this circuit, the voltage across R4 is approximately 10 volts. At this time the collector of Q2 is at about 10.5 volts. The collector of Q1 is at 16 volts. The base of Q2 is approximately 10.5 volts. When skid information is detected and processed by the system of FIG. 1 in the manner understood by those skilled in the art, a valve dump voltage is provided at the output of the valve driver 16 of FIG. 1 which energizes valve 18 to dump pressure and release brake 22, providing a release of braking effort on wheel 24 in the manner understood by those skilled in the art. This valve dump voltage represented herein in the graph of FIG. 3 and which is provided at input terminal 32 of FIG. 2 forces the base of transistor Q2 negative when the valve dump voltage is in the form of a negative going signal. The valve dump voltage is a negative going signal when it is dropping in amplitude towards 0 volts at the time it is being turned off as can readily be seen when specific reference is made to the valve driver output voltage curve of FIG. 3 at time $t_4$. When this negative going valve driver output voltage which is at this time the amplified valve dump voltage is impressed on the base of transistor Q2 by way of input terminal 32 through input coupling network R9 and C2, then Q2 stops conducting and the voltage across R4 decreases. Transistor Q1 turns "on" (the collector emitter path of Q1 becomes conductive) causing the voltage on the collector of Q1 to drop to a value of approximately 10 volts which voltage is impressed on the base of transistor Q2 by the circuit path through capacitor C1 and which voltage remains until the current passing through R3 raises the voltage at the base of Q2 to again turn on transistor Q2. The charging time of timing capacitor C1 is determined by the component values of capacitor C1 and resistor R1. It has been found in practicing the present invention that in one embodiment thereof where the natural frequency of the landing gear was 10 cycles per second which otherwise expressed is a time period of 0.10 seconds, a predetermined charging time for capacitor C1 of 130 milliseconds was desirable and was achieved by selecting a capacitor C1 having a value of 4.4 microfarads and selecting a variable resistor R3 capable of providing a resistance value of 150,000 ohms. The time period for charge of capacitor C1 equals the product of R3 and C1. The resistor R3 may be a variable type resistor as shown in FIG. 2 which permits the time period selected to be varied above and below 130 milliseconds if desired. When transistor Q2 is off as described above during the charging period of capacitor C1, the collector voltage of transistor Q2 is 16volts which is a high enough value of voltage to cause the voltage established at the base of transistor Q3 through the circuit path including diode CR2 and Zener diode VR2 and resistor R8 to turn on transistor Q3, thus closing the DC switch 26 by providing current conduction from terminal 34 through the collector and emitter of transistor Q3 to ground. The voltage at the collector of transistor Q3 and the terminal 34 connected thereto which drops when transistor Q3 is turned on may be utilized to hold open the circuit path between the dump voltage represented by block 14 of FIG. 1 and the valve 18 at some point along this circuit path so that the valve 18 cannot be energized. In FIG. 5, transistor Q3 is shown with collector coupled to output terminal 34 which is in turn coupled to the base of transistor T3. The collector voltage of transistor Q3 is low when transistor Q3 is conducting or in the turned on condition, and this collector voltage which is applied to the base of transistor Q3 prevents Q3 from turning on and providing a circuit path through transistor Q3 for dump voltage control of the means for releasing braking effort which includes the valve. It is apparent from the foregoing how the switching means of block 26 may be utilized to interrupt the circuit path between a dump voltage control signal generated by skid information and the valve servopilot.

Since the input terminal 32 of the stabilizing circuit is connected in the dump voltage circuit path between the output of the valve driver 16 and the input of valve 18 as seen in FIG. 1, the input terminal 32 receives both modulator signal voltage signals which constitute first control signals capable of modulating brake pressure and also dump voltage signals which constitute second control signals for rapidly relieving or dumping brake pressure. The one shot multivibrator 28 must be placed in its set state for a predetermined time period to cause DC switch 26 to open the dump voltage to valve path for this predetermined time period but the one shot multivibrator comprising the timing means 28 must respond only to a dump voltage control signal and not to a modulator signal voltage since it is desired to detect the occurrence of a dump voltage and prevent the control effect of a second dump voltage without detection of and/or interference with the processing by the antiskid control system of modulator signal voltages. The circuit component values selected for input network resistor R9 and input network capacitor C2 are determinative of the amplitude of trigger signal which will set the one shot multivibrator 28. In a typical system utilizing the circuit of FIG. 2, the resistance R9 was selected to be 5,000 ohms and the capacitance value of C2 selected was 2.0 microfarads. The effect of valve dump voltages and modulator voltages upon the stabilizing circuit of FIG. 2 and the antiskid system of FIG. 1 which stabilizes will be better understood with reference to FIG. 3. In FIG. 3, the upper graph shows at time $t = t_1$ that the output of the valve driver is 0 volts which indicates to those skilled in the art that the wheelspeed detection arrangement of block 10 in FIG. 1 is not transmitting the type of wheelspeed information which requires the system through skid detector 12, modulator 30 and dump voltage signal translating means 14 to modulate or rapidly dump brake pressure. At time $t_2$ it would also be recognized that skid information has been detected and processed by the system to provide a valve dump voltage. This valve dump voltage causes release of brake pressure since it is applied as a control signal to the servopilot valve to bypass fluid under pressure around the brake cylinder. From the graph it can be seen that this valve dump voltage rises to the value $V_D$ which in practice of the circuit embodiment of FIG. 2 is about 8 or 9 volts. This rise of valve dump voltage at time $t_2$ or its steady value at time $t_3$ does not set the one shot multivibrator 28 since the positive change of voltage which occurred at time $t_2$ is a positive going signal not capable of turning off transistor Q2 when applied to the base thereof and capacitor C2 blocks the steady potential $V_D$ occurring at time $t = t_3$ from being applied to the base of transistor Q2. At time $t = t_4$, however, a negative going voltage is presented at terminal 32 and this negative pulse is sufficient when applied through resistor R9 and capacitor C2 to trigger transistor Q2 into an "off" condition, causing the one shot multivibrator to go into its astable state for a predetermined time period as discussed above in the description of FIG. 2. The resistance value of R9 is determinative of the amplitude of the negative going pulse required to trigger transistor Q2 into its "off" condition. The modulation voltage may fluctuate up to a maximum value $V_M$ of around 6 volts. In such case R9 is selected to permit a voltage difference of 2 volts or more to provide the negative going difference voltage or trigger pulse at the base of transistor Q2 which turns off transistor Q2. Since valve dump voltage $V_D = 8$ volts minimum and $V_M = 6$ volts maximum, then $V_D - V_M = 2$ volts, and negative going differences of 2 volts or more will be permitted to trigger multivibrator 28, and the desired mode of operation is achieved. The resistance value of R9 therefore does not permit small negative going difference voltages due to fluctuation in modulation voltage to set the one shot multivibrator circuit 28 but permits only a negative going pulse of the type which only appears at the trailing edge of the valve dump voltage and which is a larger difference voltage to set the multivibrator circuit. The resistance value of resistor R9, when properly selected as explained in the preceding, provides the means for achieving the important function of rejecting modulation information and preventing its interference with the desired mode of operation of the antiskid control system circuit of the present invention by undesired and untimely triggering of the multivibrator circuit. The negative going voltage difference represented by the trailing edge of the valve dump voltage at time $t_4$ sets the multivibrator circuit 28 causing DC switch 26 to close by forming a closed circuit path from terminal 34 through switching transistor Q3 to ground. The voltage at output terminal 34 caused by the decreased collector voltage of Q3 may be utilized as a switching voltage to inhibit the flow of a valve dump voltage to energize the servopilot valve causing the release of pressure and consequent braking effort at valve 18 by interrupting the circuit path at some point intermediate the dump voltage generated and the servopilot valve. While the first occurrence of valve dump voltage energizes the servopilot valve, the switch 26 is closed by this first occurrence of valve dump voltage opening the above-mentioned circuit path and the circuit path is held open by the switch for the predetermined time interval from time $t_4$ to time $t_6$ thus preventing any subsequent valve dump voltage signal generated from being transmitted along the circuit path and energizing the servopilot valve.

The following circuit component values were used successfully in the operation of the stabilizing circuit embodiment of FIG. 2:

R1 = 3 thousand ohms.
R2 = 3 thousand ohms.
R3 = 150 thousand ohms variable.
R4 = 5 thousand ohms.
R9 = 5 thousand ohms.
C1 = 4.4 microfarads.
C2 = 2 microfarads.
VR1 = Zener diode, voltage drop = 10 volts.
VR2 = Zener diode, voltage drop = 12 volts.
Q1, Q2, Q3 = Transistors, type 2N1711.

The component values given above are dependent upon the voltage operating levels and system requirements but are easily computed by those skilled in the art and should therefore not be considered limiting but merely illustrative of one embodiment of the invention. Further, those portions of the system delineated in block diagram form in FIG. 1 as pointed out previously which represent corresponding portions of the Anderson et al. system should not be considered limited to the circuitry of Anderson et al. performing the corresponding functions but the Anderson circuitry should be considered merely illustrative of one example of the circuitry which may be utilized to perform these functions.

Turning now to FIG. 4 of the drawings, there is shown in block diagram form another system incorporating the teachings of the present invention. The system of FIG. 4 is illustrative of a further class of systems which can utilize the features of the present invention. The first class of systems as represented by the system of FIG. 1 which utilized the present inventive concepts, developed preskid information and provided a control signal output from block 20 in FIG. 1 which caused the remaining portion of the system to modulate brake pressure in response to the preskid information processed. It can be noted by comparison of the block diagrams of FIG. 1 and FIG. 4 that this further class of systems represented in FIG. 4 does not include the modulator 32 but only uses a dump voltage output from block 14 for control purposes in relieving brake pressure. It can be remembered from the above discussion in connection with the description of FIG. 1 that a dump voltage control signal is provided upon occurrence of an actual skid. The system of FIG. 4 can be seen therefore as not responsive to preskid information since not incorporating a modulator but being responsive to and providing a reduction in braking effort upon actual slipping of the wheel. U.S. Pat. No. 3,245,213 to Thompson et al. is illustrative of this further class of systems. FIG. 4 represents this Thompson et al. type system in block diagram form modified in accordance with the teachings of the present invention. The system of Thompson et al. is incorporated herein by reference, with FIG. 5 of this application showing specifically the block L of FIG. 2 portion of the Thompson et al. system as modified to incorporate the stabilizing circuit in accordance with the teachings of the present invention. The same legends of FIG. 2 of this application have been retained to identify the corresponding circuit components in the FIG. 5 circuit of this application. The remaining legends of FIG. 5 in this application are the same legends used in FIG. 2 of the Thompson et al. patent and are retained herein to identify lead lines which provide the external connections from block L to the remaining portion of the Thompson et al. system. Input terminal 32 is connected to line 22 to sense the negative going difference in voltage provided by the trailing edge of a dump signal in the same manner as heretofore described with reference to FIGS. 1, 2, and 3. Output terminal 34, as mentioned earlier in connection with the description of FIG. 2, provides a conductive path to ground (the DC switch closes) for the predetermined time period that it is not desired to pass a subsequent valve dump voltage. The output terminal 34 since coupled to the base of transistor T3 lowers the potential on the base of transistor T3 when switching transistor Q3 is closed and prevents transistor T3 from turning on (becoming conductive) and the path through transistor T3 is open thereby inhibiting the passage of a dump voltage therethrough to rapidly dump brake pressure. After the predetermined time period has elapsed then the DC switch opens since switching transistor Q3 stops conducting and the collector voltage of transistor Q3 as also applied to the base of transistor T3 rises permitting transistor T3 to again become conductive and pass a dump signal to rapidly release brake pressure upon the receipt by the system of further skid information.

A previous approach to the solution of the problem of gear oscillation interference with antiskid system performance may be illustrated by reference to U.S. Pat. No. 3,017,145 to Yarber. In the Yarber patent, an arrangement is disclosed which delays response to skid signals by the utilization of time delay circuit means which thereby seeks to avoid gear oscillation by phase change of the skid correction signal. This type of solution to the problem of gear oscillation avoidance changes system response thereby affecting system performance. The features described in embodiments of the present invention do not affect the skid controlling signals and thus the response and consequent performance of the antiskid systems until just after a skid has occurred and then only a frequency clamp is utilized to prevent a second skid or dump signal from controlling brake pressure dump of that particular wheel on the multi-excited landing gear.

Since certain changes may be made in the above-described apparatus and circuits and different embodiments of the invention may be made without departing from the spirit and scope thereof, it is intended that all matter contained in the above description or shown in the accompanying drawings shall be interpreted as illustrative and not in a limiting sense.

We claim:

1. In an antiskid control system for a vehicle wheel brake, the combination of:
   means for generating a first control signal capable of modulating brake pressure in response to wheelspeed derived preskid information;
   means for generating a second control signal capable of relieving brake pressure in response to wheelspeed derived skid information; and
   means acting in response to said second control signal for preventing the reapplication of said second control signal within a predetermined time period while permitting said first control signal to modulate brake pressure during said predetermined time period.

2. In an antiskid control system for a vehicle wheel brake, the combination of:
   skid detector means for generating a first control signal when a skid develops at the wheel from overly applied brake pressure;
   first means including valve means actuatable to release the brake in response to said first signal;
   second means responsive to said first control signal for producing a second control signal having a predetermined time period; and
   switching means responsive to said second control signal for preventing reapplication of said first control signal thereby causing release of said input terminal, within said predetermined time period. period of 3. The combination defined in claim 2 in which said second means comprises monostable multivibrator circuit means having a trigger input terminal, an output terminal, and time interval determining network means for setting the predetermined time period of said second control signal generated at said output terminal when said first control signal is coupled to said trigger input terminal.

4. The combination defined in claim 2 in which said switching means comprises transistor switching circuit having an input terminal coupled to the output terminal of said monostable multivibrator circuit means, and an output terminal arranged to switch off said first control signal thereby preventing energization of said first means during said predetermined time period.

5. A brake-control system for controlling application of braking effort to a wheel of a vehicle, said system comprising, in combination with the wheel and associated brake:
   antiskid control signal generating means for generating a first control signal;
   means responsive to said first control signal to relieve braking effort applied to said wheel by the associated brake;
   means responsive to said first control signal for generating a second control signal having a predetermined time period; and
   means actuable by said second control signal to actuate arrest of release of braking effort during said predetermined time period.

6. A brake-control system according to claim 5 wherein said means responsive to said first control signal having a predetermined time period comprises monostable multivibrator circuit means having a trigger input terminal coupled to receive said first control signal and actuable to provide said second control signal when said first control signal is representative of maximum release of braking effort, said multivibrator circuit means having an output terminal for providing said second control signal, said means actuable by said second control signal comprising a switching circuit controlled by said second control signal and acting to inhibit control of braking effort when said second control signal is produced by said multivibrator circuit.

7. A brake-control system for controlling application of braking effort to a wheel of a vehicle having a plurality of independently-rotatable brake-equipped wheels, said system comprising, in combination with the wheel and associated brake:
   means for developing from wheelspeed variation an antiskid control signal;
   means coupled to receive said antiskid control signal and responsive to said control signal to relieve braking effort applied to the wheel by the associated brake over a range which includes a maximum value for relieving brake effort; and
   means coupled to receive a said antiskid control signal and including timing means initiated in action by said antiskid control signal and acting to prevent reapplication of said maximum value of release of brake effort after the first occurrence of said maximum release of brake effort.

8. In an antiskid braking system, the combination of:
   a rotatable wheel;
   p10 means to supply hydraulic braking pressure to the wheel;
   valve means to adjustably restrict the hydraulic pressure actually applied to the wheel;
   means to represent the wheel rotation as an electrical signal; and
   skid detector means coupled to said means representing wheel rotation so as to control the braking pressure to the wheel by supplying a control signal through circuit means to the valve means, said circuit means inhibiting the transmission of said control signal through said circuit means to the valve means when said control signal is repetitive of a predetermined value during a predetermined time interval.

9. The combination defined in claim 8, and in which said circuit means includes time actuatable switching means coupled in circuit path with said control signal.

10. An antiskid control system stabilizing circuit comprising:
    a monostable multivibrator circuit having an input terminal, an output terminal, and a time determining network for controlling the time duration of an output pulse generated at said output terminal in response to an input signal applied to said input terminal, said input terminal being coupled to receive an antiskid control signal for controlling application of braking effort to a wheel; and
    switching means coupled to said output terminal and controlled by said output pulse, said switching means arranged to inhibit the reapplication of said antiskid control signal in said antiskid control system during the time period of said output pulse thereby preventing control of braking effort during said time period.

11. An antiskid control system stabilizing circuit according to claim 10 wherein said time determining network includes variable resistance means for varying the duration of said output pulse.

12. An antiskid control system stabilizing circuit according to claim 10 wherein said input terminal includes means coupled in series therewith for preventing said output pulse from being generated at said output terminal when said input signal is below a predetermined negative difference voltage value.

13. An antiskid control system stabilizing circuit according to claim 10 wherein said time determining network has a time constant exceeding the natural period of the landing gear structure.

14. An antiskid control system stabilizing circuit according to claim 13 wherein said time constant is about 130 milliseconds.

15. In a control system for a brake of an aircraft wheel which is carried by longitudinally flexible landing gear structure having a predetermined natural period of oscillation, the combination of:

means driven in accordance with rotation of the braked wheel for developing an alternating current voltage substantially proportional to the speed of the wheel;

3 skid detector means responsive to said alternating current voltage and acting to produce a skid control signal;

means to relieve the brake in response to said skid control signal; and frequency clamping means to prevent reapplication of said skid control signal to said means for relieving the brake within the natural period of oscillation of the landing gear structure.

16. The combination defined in claim 15 wherein said frequency clamping means includes a timing element comprising a multivibrator circuit, said clamping means further including switching means coupled to said multivibrator circuit and controlled thereby, said switching means actuable to arrest reapplication of said skid control signal within the natural period of oscillation of the landing gear structure thereby preventing a second skid signal from the excited gear.

UNITED STATES PATENT OFFICE
CERTIFICATE OF CORRECTION

Patent No. 3,545,819             Dated December 8, 1970

Inventor(s) William Charles Gaffney et al.

It is certified that error appears in the above-identified patent and that said Letters Patent are hereby corrected as shown below:

Column 7, lines 50 and 51, "thereby causing release of said input terminal, within said predetermined time period. period of" should read -- thereby causing release of said brake within said predetermined time period. --.

Signed and sealed this 25th day of May 1971.

(SEAL)
Attest:

EDWARD M. FLETCHER, JR.            WILLIAM E. SCHUYLER, JR.
Attesting Officer                      Commissioner of Patents